(12) United States Patent
Greenberg

(10) Patent No.: US 12,226,033 B2
(45) Date of Patent: Feb. 18, 2025

(54) SUPER BIODEGRADABLE STRAWS AND METHOD FOR MAKING THE SAME

(71) Applicant: Alan Richard Greenberg, Los Angeles, CA (US)

(72) Inventor: Alan Richard Greenberg, Los Angeles, CA (US)

( * ) Notice: Subject to any disclaimer, the term of this patent is extended or adjusted under 35 U.S.C. 154(b) by 871 days.

(21) Appl. No.: 17/218,053

(22) Filed: Mar. 30, 2021

(65) Prior Publication Data

US 2021/0345803 A1 Nov. 11, 2021

Related U.S. Application Data

(60) Provisional application No. 63/003,630, filed on Apr. 1, 2020.

(51) Int. Cl.
| | | |
|---|---|---|
| *A47G 21/18* | (2006.01) | |
| *B29C 48/00* | (2019.01) | |
| *B29C 48/09* | (2019.01) | |
| *B29D 23/00* | (2006.01) | |
| *B29K 1/00* | (2006.01) | |
| *B29K 105/00* | (2006.01) | |
| *C08L 97/02* | (2006.01) | |
| *C09J 105/00* | (2006.01) | |
| *C09J 191/06* | (2006.01) | |

(52) U.S. Cl.
CPC ............ *A47G 21/18* (2013.01); *B29C 48/022* (2019.02); *B29C 48/09* (2019.02); *B29D 23/00* (2013.01); *C08L 97/02* (2013.01); *C09J 105/00* (2013.01); *C09J 191/06* (2013.01); *B29K 2001/00* (2013.01); *B29K 2003/00* (2013.01); *B29K 2105/0038* (2013.01); *B29K 2995/006* (2013.01); *C08L 2201/06* (2013.01)

(58) Field of Classification Search
CPC ........ A47G 21/18; B29D 23/00; B29C 48/09; B29C 48/022; B29K 2995/006; B29K 2001/00; B29K 2105/0038; B29K 2003/00; C08L 97/02; C08L 2201/06; C09J 105/00; C09J 191/06
See application file for complete search history.

(56) References Cited

U.S. PATENT DOCUMENTS

| | | | | |
|---|---|---|---|---|
| 7,083,673 | B2 * | 8/2006 | Bowden | .................... C08L 3/02 264/300 |
| 2005/0037112 | A1 * | 2/2005 | Daley | .................. A47G 21/183 426/104 |
| 2009/0274920 | A1 * | 11/2009 | Li | .............................. B32B 7/12 264/210.1 |
| 2016/0108187 | A1 * | 4/2016 | Wendeln | .................. C08J 3/005 524/15 |

FOREIGN PATENT DOCUMENTS

| | | | |
|---|---|---|---|
| CA | 3027658 | * | 12/2019 |
| DE | 202018106080 | * | 3/2020 |
| TW | 567058 U | * | 9/2018 |
| WO | WO 2018090087 | * | 5/2018 |

OTHER PUBLICATIONS

Machine English translation of DE 202018106080, Lubcke, Mar. 5, 2020. (Year: 2020).*

* cited by examiner

*Primary Examiner* — Patrick D Niland
(74) *Attorney, Agent, or Firm* — Olivo IP Law Group, P.C.; John W. Olivo, Jr.

(57) ABSTRACT

The present invention relates to drinking straws that are made from biodegradable material or bioplastics. The process to manufacture the present invention can use waste lipid wax byproducts. The present invention can incorporate chemical modification of corn or hemp fiber waste, and is comprised of wax byproduct, xanthan gum, carnauba wax and stearic acid. Stearin, hardener and plasticizers are mixed with corn or soy wax. A binder ingredient can be added to the waxes and fiber mixture, resulting in a smooth and hard, durable and biodegradable material with a high melting point. This material is then processed using an extrusion method, whereby the mixed ingredients are forced through an opening in a perforated plate or die with a design specific to form a straw, and then cut into a specific size by blades. The extruder consists of a large, rotating screw tightly fitting within a stationary barrel, at the end of which is the die. Extrusion enables mass production of food via a continuous, efficient system that ensures uniformity of the final product.

20 Claims, 4 Drawing Sheets

SUPER BIODEGRADABLE STRAWS AND METHOD FOR MAKING THE SAME

PRIORITY CLAIMS

This application claims the benefit of U.S. Provisional Patent Application Ser. No. 63/003,630, filed on Apr. 1, 2020, the contents of which are incorporated by reference.

BACKGROUND OF THE INVENTION

Traditional drinking straws are constructed from plastic and intended to be used once before disposal. Plastic takes hundreds of years to biodegrade, thus contributing massive amounts to landfill, damaging fragile eco systems and harming wildlife, particularly marine ecosystems and wildlife. Many state and local governments are considering taking action to have food purveyors distribute straws only upon request. The massive buildup of straws in the ocean into large masses of waste, dangerous to marine life, has sensitized the public to this emerging and growing problem.

Traditional plastic is made from petroleum-based raw materials. Biodegradable plastics (Bioplastics), which are made from 20 percent or more of renewable materials, could be seen as the solution to plastic pollution. The advantages of bioplastics are reduced use of fossil fuel resources, a smaller carbon footprint, and faster decomposition. Bioplastic is also less toxic and does not contain bisphenol A (BPA), a hormone disrupter that is often found in traditional plastics. While an improved solution, it goes only part of the way towards use of renewables. In general, single-use traditional plastic straws can take hundreds of years to biodegrade, which contributes to enormous amounts of landfill and pollution of the oceans, where they harm marine life and release toxic pollutants.

Biodegradable plastic can be broken down completely into water, carbon dioxide and compost by microorganisms under the right conditions. The term "Biodegradable" implies that the decomposition happens in weeks to months. Bioplastics that don't biodegrade that quickly are called "durable," and some bioplastics made from biomass that cannot easily be broken down by microorganisms are considered non-biodegradable.

Bioplastics are currently used in disposable items like packaging, containers, straws, bags and bottles, and in non-disposable carpet, plastic piping, phone casings, 3-D printing, car insulation and medical implants. One of the most common types of bioplastic used today is polyactic acid (PLA). PLA is typically made from the sugars in corn starch, cassava or sugarcane. It is biodegradable, carbon-neutral and edible. To transform corn into plastic, corn kernels are immersed in sulfur dioxide and hot water, where its components break down into starch, protein, and fiber. The kernels are then ground, and the corn oil is separated from the starch. The starch is comprised of long chains of carbon molecules, similar to the carbon chains in plastic from fossil fuels. Some citric acids are mixed in to form a long-chain polymer that is the building block for plastic. PLA can look and behave like polyethylene, polystyrene or polypropylene.

PLA can be composed of agricultural products such as corn bran and Dried Distillers Grains (DDG), which are produced in large quantities as byproducts of corn and ethanol processing. Corn bran and DDG are composed of cellulose, protein, starch, lipid, minerals, and arabinoxylan (AX). These fractions can be utilized for various value-added food and industrial applications, such as food packaging materials. Corn milling byproducts such as DDG are primarily used for feed. Expanding the array of products for corn byproducts that expand beyond feed is highly encouraged to add value to these byproducts.

In response to these changing consumer demands and pressure from environmental advocates, reusable and recyclable alternatives to the single use-plastic straws are growing in availability. However, all currently available alternatives have a number of limitations preventing their widespread adoptions. Reusable alternatives such as the bamboo, metal and glass straw require the user to carry the device on their person and then wash it after each use. Furthermore, the relatively high cost and requirement and difficulty involved in washing these alternatives prohibit food and drink outlets from distributing them on a large scale. Biodegradable single-use paper straws are growing in popularity. However, as the device absorbs water its structural integrity is compromised, thus reducing the drinking experience. Consumers are often left with a limp straw that catches, in particular, on the relatively sharp edge of a drink cup disposable lid, thereby destroying the straw mid-drink. Accordingly, consumers are rejecting such straws. Paper straws are not likely to satisfy consumers.

Recently, pasta straws made from pasta, which is an organic material, has been proposed. It has the advantage of being biodegradable in a matter of weeks and can even be consumed or composted. However, while pasta straws can be produced at a relatively low cost, food grade material, edible and capable of nutrition, is being thrown away, literally. While past straws have certain advantages, they are engineered essentially as edible products, departing from years of manufacturing straws for particular purposes. Therefore, there exists a need not to throw out all prior straw manufacturing techniques, but to change the materials used to construct drinking straws, away from plastic.

In addition, there exists a need to maintain the drinking straw performance the public has come to expect yet do so in a biodegradable manner. And by a biodegradable manner, meaning a super biodegradable manner, so that straws do not take years to break up into non-harmful components but do so in a manner of weeks.

The need to find alternatives to the plastic straw is becoming evident with many large firms looking for alternatives, to ensure that they are able to contribute by taking a stance against polluting the environment and being environmentally friendly and sustainable businesses, yet paper straws and pasta straws both fall short.

SUMMARY OF THE INVENTION

The present invention relates to drinking-straws for consuming beverages. More importantly, the present invention relates to drinking-straws that are super or especially biodegradable. That is, they break down into non-harmful components in a relatively small amount of time, to be used for the purposes of suctioning-up and consuming beverages, foods, ingredients, and so on.

It is accordingly an object of the invention to provide a straw and a method for making the straw that overcome the hereinbefore-mentioned disadvantages of the currently known devices. The present invention provides a disposable straw that resists breaking down during its usage with cold or ambient temperature beverages or viscous fluids, while being especially or super biodegradable, so that the environment is not negatively impacted.

The present invention provides a hollow, tubular organic fiber-based object through which beverages are imbibed. It functions like a straw when immersed in cold and room temperature beverages, such as milk, soy milk, rice milk, yogurt drinks, smoothies, shakes, juice and the like, and is completely edible.

The straw may be constructed of fibers from sun flowers, corn fibers or husks, and then bound together with substances such as xanthan gum, carnauba wax, beeswax, and so forth. Importantly, the straws may be optimized with readily materials (both in terms of the structural fibers and the binding agents), so as to be durable enough for normal drink usage, cut resistant to avoid being sliced open or perforated by a plastic drink like with its relatively sharp edges, yet super biodegradable so that it breaks up into its constituent components in a relatively short amount of time.

The process by which the straws are made are well known in the art. Importantly, it is very important to form the straws at the correct temperatures and with the correct and optimal extrusion processes given the materials selected for straw composition.

In another embodiment, the process to manufacture the present invention can use waste waxes derived from waste lipids. The first step involves processing corn germ from wet milling or dry milling is to properly prepare the seed for oil removal. The seed is delivered clean; additional cleaning with a magnet and screener may be done to remove any impurities or fines. For dry-milled germ, the seed is conditioned, flaked and sent to solvent extraction. For wet-milled germ, the seed is conditioned, flaked and cooked, then pressed prior to solvent extraction. For smaller capacities, the germ can be full pressed instead of solvent extracted.

The wet-milled germ seed is mechanically pressed or pre-pressed, to extract approximately half to three quarters of the available oil so that the solvent extraction can be run more efficiently. The solvent extraction process uses hexane or other solvents to wash the corn oil from the prepared flakes or press cake. Extracted corn oil must be further processed to make an edible product. Edible oils are refined to improve the flavor, odor, color and stability using processes that degum, neutralize, bleach and deodorize the oil. These refining processes remove contaminants such as phosphatides, free fatty acids and pro-oxidants.

In another embodiment, the present invention can incorporate chemical modification of corn or hemp fiber lipid waste. Corn or hemp fiber nano-crystals can be prepared from partial acid hydrolysis on amorphous regions of starch granules. PLA can be produced by chemical conversion of corn or other carbohydrate sources into dextrose. Dextrose is fermented to lactic acid followed by polycondensation of lactic acid monomers or lactide. The corn or hemp fiber can be customized under starch-filled polymer systems to improve the chemical compatibility between synthetic and starch polymers. Another type of bioplastic polymer, known as thermoplastic starch, can be synthesized through the addition of plasticizers (e.g., polyols, glycerol, fructose, and urea). Both the mechanical and thermal energy transferred to starch dough during extrusion can help break hydrogen bonds in starch granule crystallites. However, the produced thermoplastics may lack mechanical strength and show high sensitivity to moisture. To improve the mechanical strength (or to chemically modify the surfaces) of these thermoplastics, they can be mixed with suitable nano-fillers or blended with diverse forms of hydrophobic polymers.

Sunflower, corn, canola and grapeseed oils contain non-triglyceride compounds that create a haze, or wax, in the oil when chilled or stored for long periods of time. Chilling, followed by filtration and centrifugation, removes these compounds.

In another embodiment, the present invention can be made up of wax byproduct, xanthan gum, carnauba wax and stearic acid. Stearin, hardener and plasticizers are mixed with corn or soy wax. This material solidifies and will stay solid at temperatures of up to 120 degrees Fahrenheit. Crude oil from hemp production can also be used. Waxes and lipids are the byproduct of distillation and are strained and filtered. These lipids, when mixed with carnauba wax, become hardened and solid. Waste waxes mixed with waste lipids create an internal lattice structure from the hairs that creates a sheet. Adding a binder ingredient to the waxes and lipids mixture results in a smooth and hard, durable and biodegradable material with a high melting point.

In one embodiment, a hardener, such as a candle hardener, can be used. Candle hardener is a synthetic wax which has a melting point of around 90 degrees C. Because of its high melting point, it is a very hard and durable wax.

In another embodiment, a plasticizer can also be used in the manufacturing process of the present invention. Plasticizer is also a synthetic material which like hardener has a high melting point. It makes the wax go more pliable at temperatures just below its melting point and makes it thicker once melted.

In another embodiment, beeswax can also be used in the manufacturing process of the present invention. Beeswax is softer than paraffin and has a lower melting point.

Various manufacturing processes may be applicable to practice the present invention. Moreover, according the present invention, semi-rigid material may be formed into or extruded into the shape of a drinking straw. Likewise, the same material may be formed into a container for take-out food products, and a corresponding and reciprocating snap on lid, also made of the same bio-friendly material. In one possible manufacturing process, both dewaxing and winterization are utilized. The waxes that are discarded during the winterization process are the same for corn oil or hemp oil. The name winterization applies to a low temperature application, so that waxes present in the oil crystallizes, yielding a hazy appearance to the oil. Some oils are dewaxed before packing so as to remove waxes, which are dissolved in the oil. The reason for the hazy appearance is due to the precipitation of dissolved waxes. The presence of wax makes the oil appear cloudy at room temperature. The oil normally becomes cloudy in 5-6 hours but with proper dewaxing the oil remains clear after 24 hours of storage at a cool temperature. Accordingly, chilling, followed by filtration, removes these useful compounds. Notably, food vessels or straws according to the present invention may utilize these waxy by products in a cost-effective manner.

Sunflower, corn, canola and rapeseed oils contain non-triglyceride compounds that create a haze, or wax, in the oil when chilled or stored for long periods are all potential building blocks for use according to the present invention.

The present invention also uses a manufacturing process known as extrusion to create the straw. Extrusion is a process used to create objects of a fixed cross-sectional profile. A material is pushed through a die of the desired cross-section. The two main advantages of this process over other manufacturing processes are its ability to create very complex cross-sections, and to work materials that are brittle, because the material only encounters compressive and shear stresses. It also forms parts with an excellent surface finish. Extrusion may be continuous (theoretically producing indefinitely long material) or semi-continuous (producing many pieces). The extrusion process can be done with the material hot or cold. Commonly extruded materials include metals, polymers, ceramics, concrete, modelling clay, and foodstuffs. The products of extrusion are generally called "extrudates".

The present invention is comprised of a biodegradable material and uses a specific process similar to that which is used in material extrusion. Material extrusion is a process by which a set of mixed ingredients are forced through an opening in a perforated plate or die with a design specific to the material to be formed and then cut into a specific size or length by blades. The machine which forces the mix through the die is an extruder, and the mix is known as the extrudate. The extruder consists of a large, rotating screw tightly fitting within a stationary barrel, at the end of which is the die. Extrusion enables mass production of material via a continuous, efficient system that ensures uniformity of the final product. According to the present invention, drinking straws may be formed via such an extrusion process.

As a part of mixing material prior to the extrusion process, raw materials are first ground to the correct particle size, usually the consistency of coarse flour. The dry mix is passed through a pre-conditioner, in which other ingredients are added depending on the target product; these may be liquid sugar, fats, dyes, meats or water. Steam is injected to start the cooking process, and the preconditioned mix (extrudate) is then passed through an extruder. As described above, the extruder may be optimally used for forming drinking straws. However, various injection molds may be used to form other desirable biodegradable food utensils or vessels, such as forks, knives, spoons, cups and containers with reciprocal snap on lids. The mixtures formed by the corn flour (or dried, milled corn cob or corn husk fibers, for example) are controlled based on the desired product to ensure uniformity of the output.

With the foregoing and other objects in view, there is provided, in accordance with the invention, a method for making a straw, including the steps of mixing structural components with forming components to create a slurry in the shape of a hollow cylinder with a cavity formed therein by way of an extrusion process, to create a straw for imbibing liquids. Such a straw will structurally hold up in beverages, will not speedily dissolve, and maintains its shape with room temperature liquids for a sufficient amount of time given the design parameters selected.

Importantly, the present invention, in a preferred embodiment, takes a safe plant byproduct like corn husk fiber. That fiber is dehydrated and ground up into a fine powder, and then mixed in with a binding and hardening agent, such as xanthan gum, carnauba wax, beeswax, or any biodegradable environmentally safe compound. Importantly, this mixture can be adjusted for a multiplicity of uses for food and beverage handling. Indeed, in an age of pandemics, take out service is more important than ever, and it is very important to have rigid take out containers, which are break down quickly after their usage yet maintain structural integrity throughout their intended usage.

These and other aspects, objects, features and advantages of the present invention, are specifically set forth in, or will become apparent from, the following detailed description of an exemplary embodiment of the invention.

DETAILED DESCRIPTION OF THE PREFERRED EMBODIMENT

Figure 1:
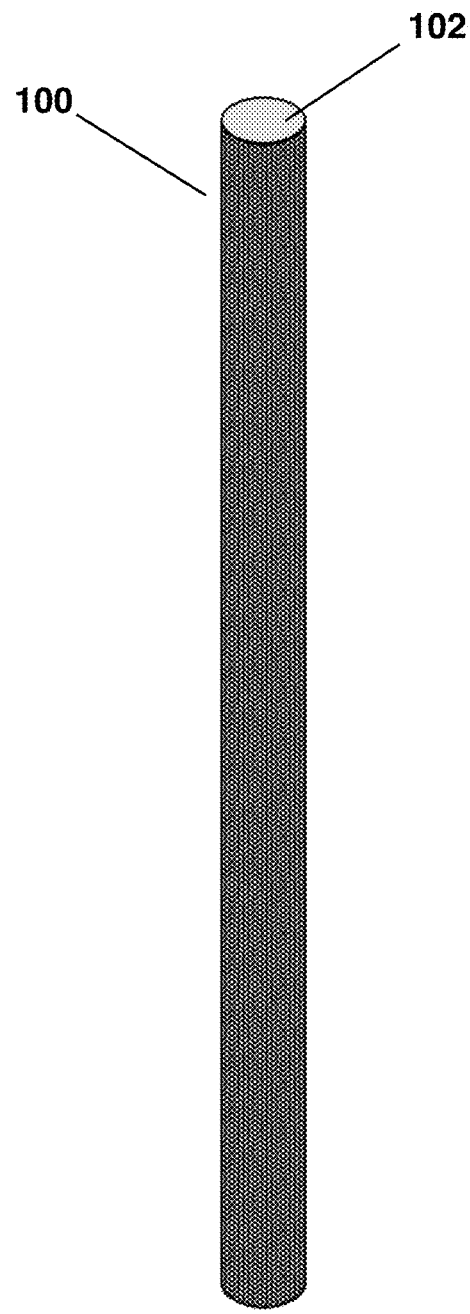
FIG. 1 is a rendering of the present invention.

FIG. 1 is a rendering of the present invention. In accordance with the preferred embodiment, the present invention is a biodegradable drinking straw 100 that is made with wax byproduct, xanthan gum, carnauba wax and stearic acid. Stearin, hardener and plasticizers are mixed with corn or soy wax. Waxes and lipids are the byproduct of distillation and are strained and filtered. These lipids, when mixed with carnauba wax, become hardened and solid. Waste waxes mixed with waste lipids create an internal lattice structure from the hairs that creates a sheet. Adding a binder ingredient to the waxes and lipids mixture results in a smooth and hard, durable and biodegradable material from which to manufacture the drinking straw 100. The drinking straw 100 is hollow in the center 102 to allow liquid to pass through with ease.

Figure 2:
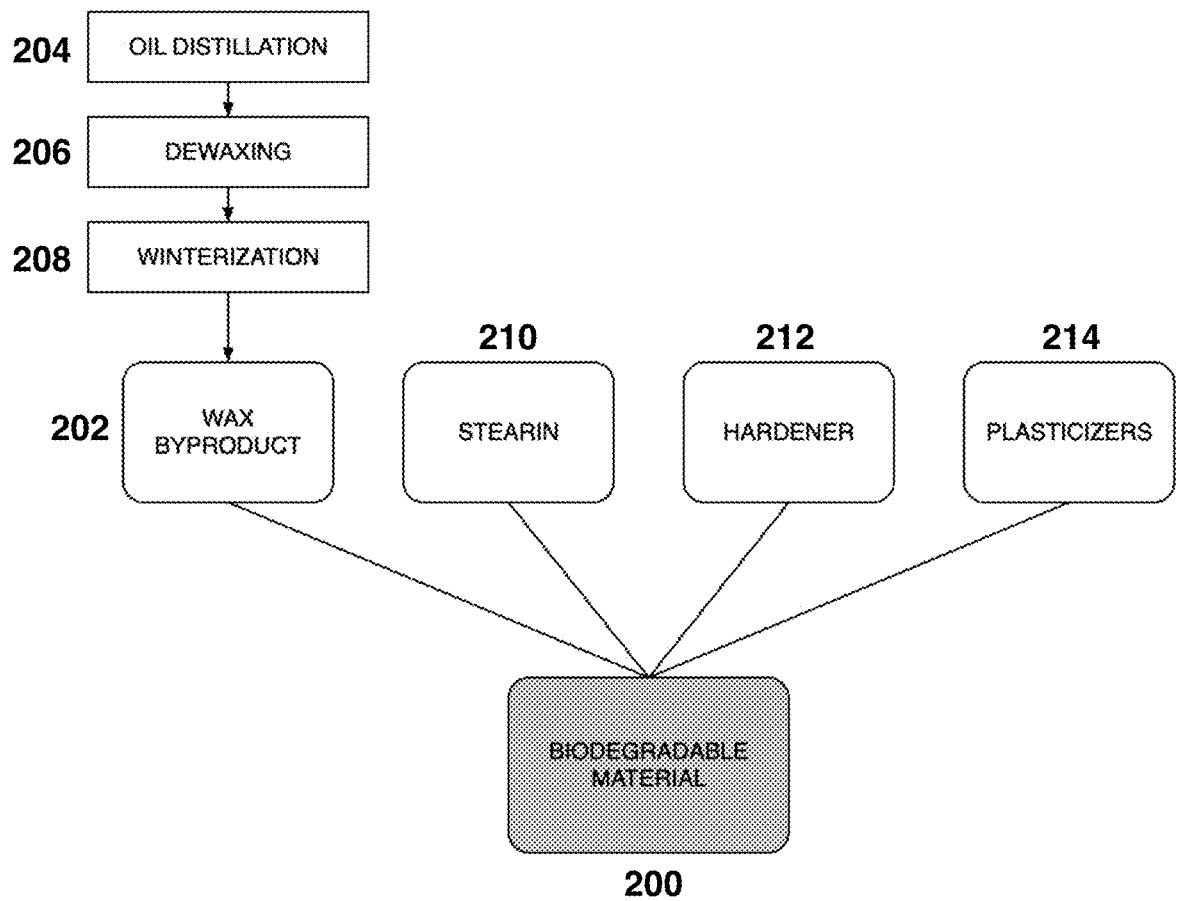
FIG. 2 is a diagram of the ingredients of the present invention.

FIG. 2 is a diagram of the ingredients of the present invention. In accordance with the preferred embodiment, the present invention is made up of a biodegradable material 200. A key component of this material is wax byproduct 202, which is formed during oil distillation 204, when oil waxes and lipids undergo a process of dewaxing 206 and winterization 208. The result is a wax byproduct 202 which is combined with a stearin 210, a hardener 212, and a plasticizer 214, to create the biodegradable material 200.

Figure 3:
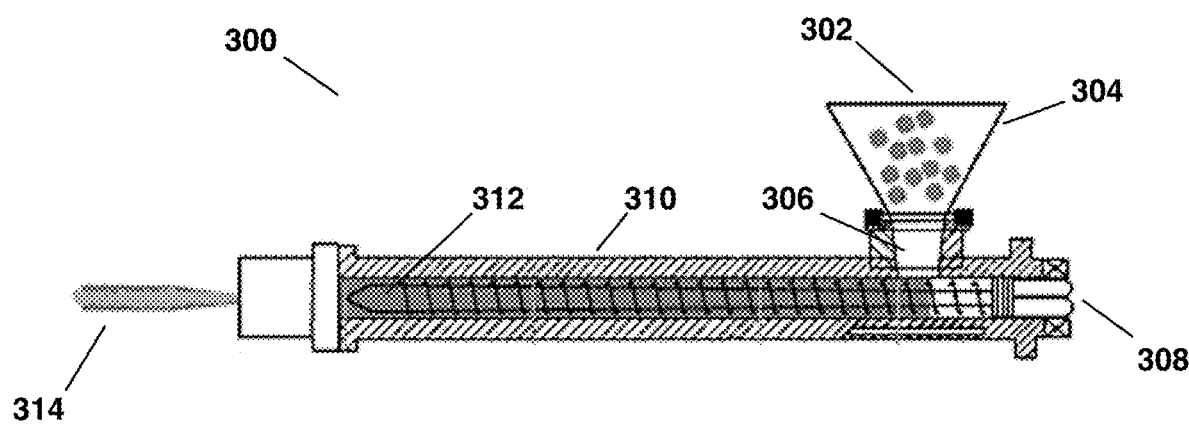
FIG. 3 is a diagram of the extrusion process of the present invention.

FIG. 3 is a diagram of the extrusion process of the present invention. In accordance with the preferred embodiment, the present invention is manufactured using an extrusion process 300. Pellets 302 that will form the material of the present invention are placed into a hopper 304 and through a feed 306 into the barrel 310. A thrust bearing motor 308 pushes a screw 312 through the barrel 310 in order to form a hollow straw 314 from the material 302.

Figure 4:
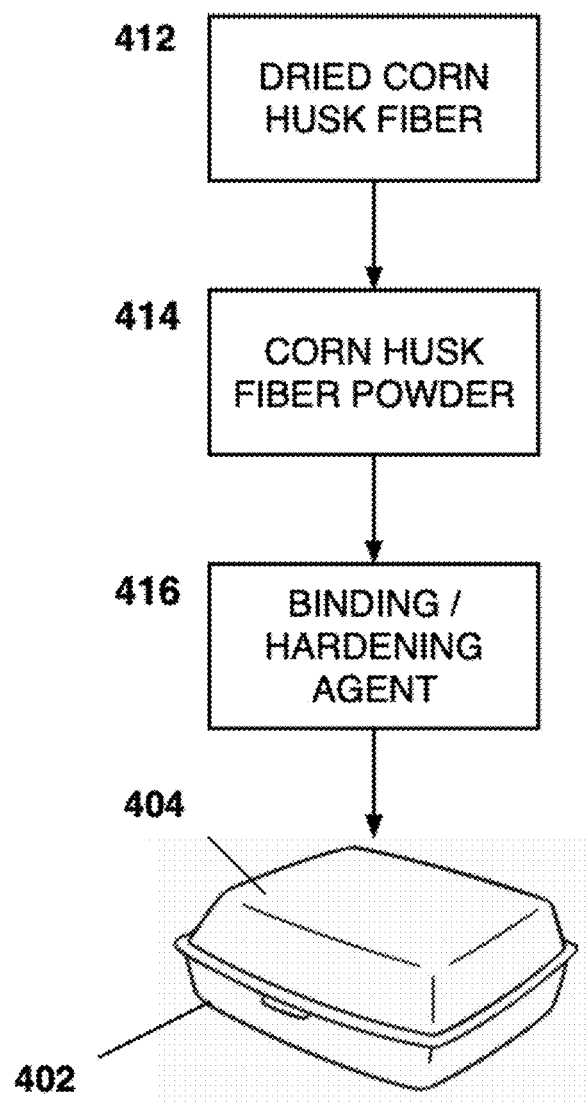
FIG. 4 is a diagram of the process of converting corn husk waste into a usable food storage and handling container.

FIG. 4 shows a process wherein corn husk waste is converted into a usable food storage and handling container, out of the same material for making drinking straws 100. Importantly, in a preferred embodiment of the present invention, corn husk fiber 412 is dried. That fiber is dehydrated and ground up into a fine corn husk powder 414, and then mixed in with a binding and hardening agent 416, such as xanthan gum, carnauba wax, beeswax, or any biodegradable environmentally safe compound. Importantly, this mixture can be adjusted for a multiplicity of uses for food and beverage handling, for example in FIG. 4, a tray 402 with a lid 404. Indeed, in an age of pandemics, take out service is more important than ever, and it is very important to have rigid take out containers, which are break down quickly after their usage yet maintain structural integrity throughout their intended usage.

By way of an alternative embodiment, corn byproducts or generally corn waste products may be formed into drinking straws or other food implements as set forth herein. Said byproducts may be immersed in or infused with a liquid wax product, such as wastes from the production of corn oil, or any waxy material that breaks down after usage of the drinking straws or food implements. Accordingly, all the material used according to the present invention is formed from corn-based waste material.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A disposable drinking straw comprised of a biodegradable material formed by an elongated tubular body suitable for allowing a user to use said straw for consuming a beverage, and wherein said elongated tubular body is formed from corn stalk-based ingredients, and comprised in part of a wax byproduct formed during an oil distillation process whereby oil waxes and lipids undergo a process of winterization and the resulting wax byproduct is combined with a stearin, a hardener, and a plasticizer to create the biodegradable material.

2. A disposable drinking straw according to claim 1 wherein said stalk-based ingredients includes husk fibers of a corn plant and a binding agent.

3. A disposable drinking straw according to claim 1 wherein said stalk-based ingredients includes the dehydrated silk of a corn plant mixed with a binding and hardening agent including any biodegradable environmentally safe compound.

4. A disposable drinking straw according to claim 1 wherein said stalk-based ingredients includes the kernels of a corn plant grounded into a state which supports cohesion to a biodegradable bonding agent after removing corn oils from said kernel.

5. A disposable drinking straw according to claim 1 wherein said stalk-based ingredients includes the dehydrated cob of a corn plant mixed with a binding and hardening agent including any biodegradable environmentally safe compound.

6. A disposable drinking straw according to claim 1 wherein said straw is constructed of dehydrated fibers from sun flowers.

7. A disposable drinking straw according to claim 1 wherein said straw is constructed of fibers from a corn plant, wherein oils from said corn plant is separated from said fibers, ground up, and then bound together with xanthan gum.

8. A disposable drinking straw according to claim 1 wherein said straw is constructed of fibers from a corn plant in a grounded state for cohesion and to maintain thickness, and then bound together with carnauba wax.

9. A disposable drinking straw according to claim 1 wherein said straw is constructed of fibers from a corn plant in a grounded state for cohesion and to maintain thickness, and then bound together with beeswax.

10. A method for making a disposable drinking straw comprising the steps of forming a biodegradable material into an elongated tubular body suitable for allowing a user to use said straw for consuming a beverage, and wherein said elongated tubular body is formed from corn stalk-based ingredients, and comprised in part of a wax byproduct formed during an oil distillation process whereby oil waxes and lipids undergo a process of winterization and the resulting wax byproduct is combined with a stearin, a hardener, and a plasticizer to create the biodegradable material.

11. A disposable drinking straw according to claim 10 wherein said stalk-based ingredients includes the husk fibers of a corn plant and a binding agent.

12. A disposable drinking straw according to claim 10 wherein said stalk-based ingredients includes the dehydrated silk of a corn plant mixed with a binding and hardening agent including any biodegradable environmentally safe compound.

13. A disposable drinking straw according to claim 10 wherein said stalk-based ingredients includes the dehydrated kernels of a corn plant.

14. A disposable drinking straw according to claim 10 wherein said stalk-based ingredients includes the cob of a corn plant being finely milled for combination with a wax substance.

15. A disposable drinking straw according to claim 10 wherein said straw is constructed of fibers from sun flowers and degrades into constituent components upon prolonged exposure to a liquid.

16. A disposable drinking straw according to claim 10 wherein said straw is constructed of fibers from a corn plant, wherein oils from said corn plant is separated from said fibers, ground up, and then bound together with xanthan gum.

17. A disposable drinking straw according to claim 10 wherein said straw is constructed of fibers from a corn plant in a grounded state for cohesion and to maintain thickness, and then bound together with carnauba wax.

18. A disposable drinking straw according to claim 10 wherein said straw is constructed of fibers from a corn plant in a grounded state for cohesion and to maintain thickness, and then bound together with beeswax.

19. A disposable drinking straw comprised of a biodegradable material formed by an elongated tubular body suitable for allowing a user to use said straw for consuming a beverage, and wherein said elongated tubular body is formed from corn stalk-based ingredients and wherein said stalk-based ingredients includes the husk of a corn plant and wherein said husk is ground up to form a powder and then dried, and wherein said dried husk powder is extruded into a drinking straw by combination with a heated emulsifier consisting of carnauba wax formed during an oil distillation process.

20. A disposable straw according to claim 19 wherein said straw is combined with a biodegradable hardening agent to enhance straw structural integrity while also enabling a gentle degradation after prolonged exposure to a liquid.

* * * * *